(12) United States Patent
Gross et al.

(10) Patent No.: US 6,950,773 B1
(45) Date of Patent: Sep. 27, 2005

(54) DETECTING THERMAL ANOMALIES IN COMPUTER SYSTEMS BASED ON CORRELATIONS BETWEEN INSTRUMENTATION SIGNALS

(75) Inventors: Kenny C. Gross, San Diego, CA (US); Peter L. Wargo, Santa Fe, NM (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/776,143

(22) Filed: Feb. 10, 2004

(51) Int. Cl.[7] ............................................... G01K 1/08

(52) U.S. Cl. ........................................ 702/132; 714/47

(58) Field of Search ....................... 702/132, 182–186, 702/130, 136; 714/47

(56) References Cited

U.S. PATENT DOCUMENTS 6,480,809 B1 * 11/2002 Slaight ...................... 702/186
2004/0078723 A1 * 4/2004 Gross et al. .................. 714/47

* cited by examiner

Primary Examiner—Michael Nghiem
Assistant Examiner—Xiuqin Sun
(74) Attorney, Agent, or Firm—Park, Vaughan & Fleming, LLP

(57) ABSTRACT

One embodiment of the present invention provides a system that detects a thermal anomaly in a computer system. During operation, the system derives an estimated signal for a thermal sensor in the computer system, wherein the estimated signal is derived from correlations with other instrumentation signals in the computer system. Next, the system compares an actual signal from the thermal sensor with the estimated signal to determine whether a thermal anomaly exists in the computer system. If a thermal anomaly exists, the system generates an alarm.

27 Claims, 2 Drawing Sheets

DETECTING THERMAL ANOMALIES IN COMPUTER SYSTEMS BASED ON CORRELATIONS BETWEEN INSTRUMENTATION SIGNALS

BACKGROUND

1. Field of the Invention

The present invention relates to techniques for enhancing availability and reliability within computer systems. More specifically, the present invention relates to a method and an apparatus for detecting thermal anomalies in computer systems based on correlations between instrumentation signals.

2. Related Art

Large eCommerce servers are increasingly being used in business-critical applications where data center outages can cost hundreds of thousands of dollars per minute. Unfortunately, large servers have large power appetites. For example, some of the next generation servers can consume up to 40 kilowatts of power. This power is ultimately converted to heat, which must be removed efficiently by continuous cooling. If internal components within the server are not kept sufficiently cool, failure mechanisms can accelerate, thereby degrading long-term system reliability and availability.

Most existing high-end servers are air cooled. One cause of problems in such servers is air-flow disturbances, which may be caused by a number of factors, including: obstructions at the inlet of the cooling-air intake; local obstructions inside the machine; a machine being moved slightly to an off-center position above a raised-floor cooling channel output (this output is supposed to mate approximately to the server's inlet channel); obstructions inside the raised-floor AC channel (for example, caused by someone routing new cables through the raised-floor channels); long-term fouling of air filters; or by problems with individual fans, which are deployed to pull cold air into and through the server.

Some high-end servers include numerous temperature sensors to protect the servers from over-temperature events. These sensors are configured to shut down system boards, domains, or the entire machine if temperatures exceed a threshold value of, such as 80 C. This type of temperature protection mechanism can effectively protect systems from acute over-temperature events. However, they are considerably less effective in protecting against the cumulative effects of lower-level temperature variations, which can significantly degrade long-term system reliability.

Existing thermal protection mechanisms lack the sensitivity to detect local airflow perturbations. For example, a common source of problems for high-end servers is having a piece of scrap paper get sucked against the cooling-air intake grill at the bottom of a server. This type of airflow obstruction can cause reliability problems, but will generally not be detected by existing thermal protection mechanisms, which are configured to have high threshold values.

Current environmental protection circuits are configured with high thresholds, and for a reason: when dealing with noisy process variables, if thresholds are set too low, a large number of false alarms would be generated from spurious data values. Note that data center ambient temperatures can vary by as much as 10 C just from normal HVAC cycling, and internal temperatures can vary even more as system load patterns vary. To avoid the possibility of nuisance shutdowns from false alarms, environmental sensors are typically configured with high threshold values that will protect the server from significant over-temperature events, but will be insensitive to more subtle perturbations from obstructing mechanisms, such as those described above. These latter perturbations, although insufficient to shut down a server, can nevertheless diminish the long term reliability of the server because of cumulative thermal stresses.

Hence, what is needed is a method and an apparatus that detects a thermal anomaly in a computer system without unnecessarily shutting down the computer system, and without subjecting the computer system to cumulative thermal stress.

SUMMARY

One embodiment of the present invention provides a system that detects a thermal anomaly in a computer system. During operation, the system derives an estimated signal for a thermal sensor in the computer system, wherein the estimated signal is derived from correlations with other instrumentation signals in the computer system. Next, the system compares an actual signal from the thermal sensor with the estimated signal to determine whether a thermal anomaly exists in the computer system. If a thermal anomaly exists, the system generates an alarm.

In a variation on this embodiment, generating the alarm involves communicating the alarm to a system administrator so that the system administrator can take remedial action.

In a further variation, communicating the alarm to the system administrator involves communicating information specifying the nature of the thermal anomaly to the system administrator.

In a variation on this embodiment, comparing the actual signal with the estimated signal involves using sequential detection methods to detect changes in the relationship between the actual signal and the estimated signal.

In a further variation, the sequential detection methods include the Sequential Probability Ratio Test (SPRT).

In a variation on this embodiment, prior to deriving the estimated signal, the system determines correlations between instrumentation signals in the computer system. These correlations can subsequently be used to generate estimated signals for thermal sensors in the computer system.

In a further variation, determining the correlations involves using a non-linear, non-parametric regression technique, such as a multivariate state estimation technique, to determine the correlations.

In a variation on this embodiment, the instrumentation signals can include: signals associated with internal performance parameters maintained by software within the computer system; signals associated with physical performance parameters measured through sensors within the computer system; and signals associated with canary performance parameters for synthetic user transactions, which are periodically generated for the purpose of measuring quality of service from and end user's perspective.

In a variation on this embodiment, deriving the estimated signal for the thermal sensor involves deriving multiple estimated signals for multiple thermal sensors in the computer system; and comparing the actual signal with the estimated signal involves comparing multiple actual signals with multiple estimated signals to determine whether a thermal anomaly exists in the computer system.

DETAILED DESCRIPTION

Figure 1:
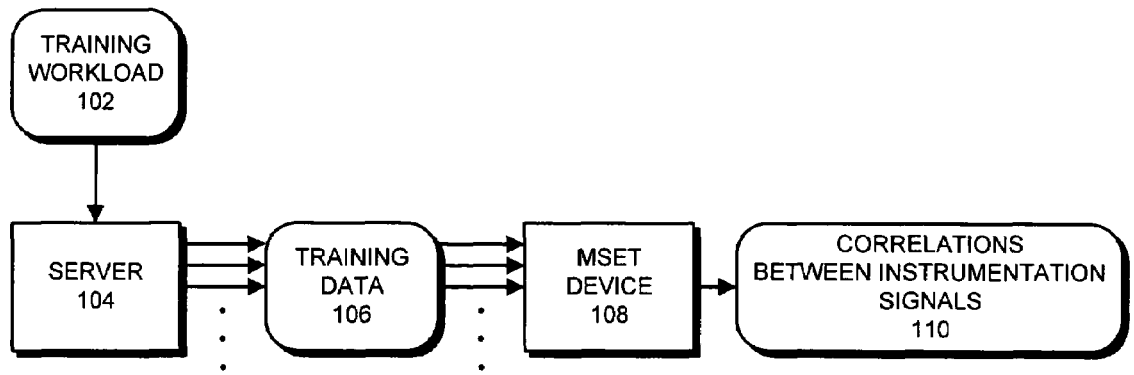
FIG. 1 illustrates a system configured to determine correlations between instrumentation signals in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Monitoring Parameters in a Computer System

One embodiment of the present invention detects thermal anomalies by continuously monitoring values of physical variables and other parameters in complex computing systems. In doing so, the present invention uses an advanced pattern recognition approach, which provides improved detection of physical variables drifting out of specification.

More specifically, the present invention continuously monitors a number of different types of instrumentation signals during operation of the server. The monitored parameters can include "internal parameters," such as performance parameters having to do with throughput, transaction latencies, queue lengths, load on the CPU and memories, I/O traffic, bus saturation metrics, and FIFO overflow statistics; "canary parameters," such as distributed synthetic user transactions that give user quality-of-service metrics 24×7; and "physical parameters," such as distributed internal temperatures, environmental variables, currents, voltages, and time-domain reflectometry readings.

The foregoing instrumentation parameters are monitored continuously with an advanced statistical pattern recognition technique. One embodiment of the present invention uses a class of techniques known as "nonlinear, nonparametric regression techniques," such as the "Multivariate State Estimation Technique," MSET. Alternatively, the present invention can use other pattern recognition techniques, such as neural networks. In each case, the pattern recognition module "learns" the behavior of all the monitored variables, and is able to estimate what each signal "should be" on the basis of past learned behavior and on the basis of the current readings from all correlated variables.

Note that MSET can be used to provide sensitive annunciation of the incipience or onset of thermal anomalies as is described in more detail below with reference to FIGS. 1–4.

Also note in additional to detecting thermal anomalies, these advanced pattern recognition techniques can be used for a variety of other beneficial reasons. These include: proactive detection of software aging problems in servers; dynamic provisioning for optimization of energy utilization; improved proactive detection of anomalies in the dynamical performance of servers; improved performance management; and self-healing and closed-loop autonomic control.

Determining Correlations

Figure 2:
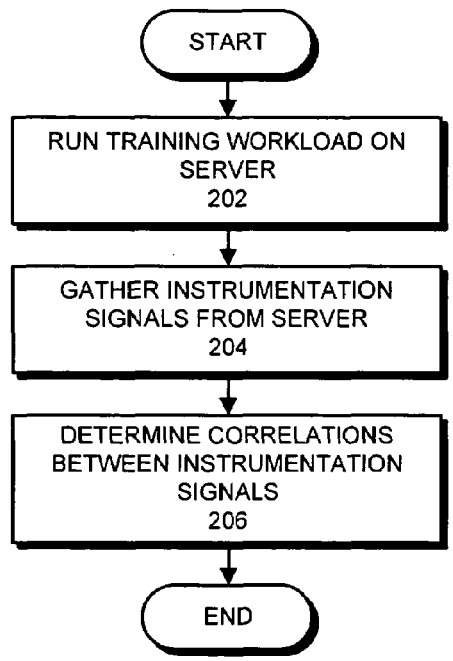
FIG. 2 presents a flow chart of the process of determining correlations between instrumentation signals in accordance with an embodiment of the present invention.

FIGS. 1 and 2 illustrate the process of determining correlations between instrumentation signals in accordance with an embodiment of the present invention. In this embodiment, a training workload 102 is executed on a server 104 to produce instrumentation signals from potentially hundreds of sensors associated with system components within server 104 (step 202). Note that this training workload 102 can be an actual system workload gathered over different times of the day and different days of the week.

In one embodiment of the present invention, the system components from which the instrumentation signals originate are field replaceable units (FRUs), which can be independently monitored as is described below. Note that all major system units, including both hardware and software, can be decomposed into FRUs. (For example, a software FRU can include, an operating system, a middleware component, a database, or an application.)

In one embodiment of the present invention, training workload 102 includes different workload profiles. For example, training workload 102 can include: (1) no load, which enables the system to learn patterns during quiescent system operation; (2) a maximum load, which can be generated by a mathematical package, such as LinPack; and (3) a deterministic load, for example, generated with a multi-frequency, sinusoidal dynamical system characterization technique (see published U.S. Patent Application No. U.S. 20020198684A1, entitled "Method and Apparatus to Facilitate Measurement of Quality-of-Service Performance of a Network Server," by inventors Kenny C. Gross and David M. Fishman).

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance. Furthermore, the present invention can also be applied to a networked collection of servers.

The instrumentation signals are gathered from server 104 to form a set of training data 106 (step 204). In one embodiment of the present invention, the instrumentation signals are gathered through a "telemetry harness," which provides real-time outputs for the instrumentation signals. Note that these instrumentation signals can include signals associated with physical performance parameters measured through sensors within the computer system. For example, the physical parameters can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from and end user's perspective.

This training data feeds into a multivariate state estimation technique (MSET) module 108, which determines a set of correlations between instrumentation signals 110 (step 206). Note that the term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13–17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Once these correlations have been determined by MSET device 108, they can be used to detect thermal anomalies as is described below with reference to FIGS. 3 and 4.

Detecting a Thermal Anomaly

Figure 3:
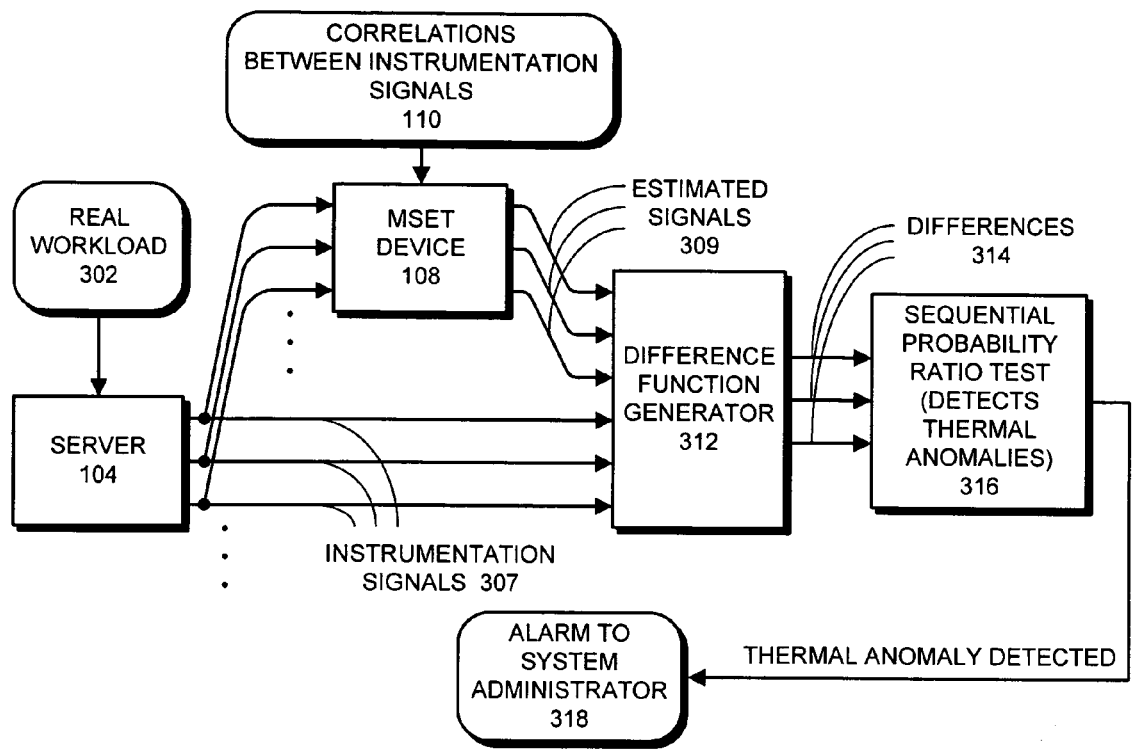
FIG. 3 illustrates a system configured to detect a thermal anomaly in accordance with an embodiment of the present invention.
Figure 4:
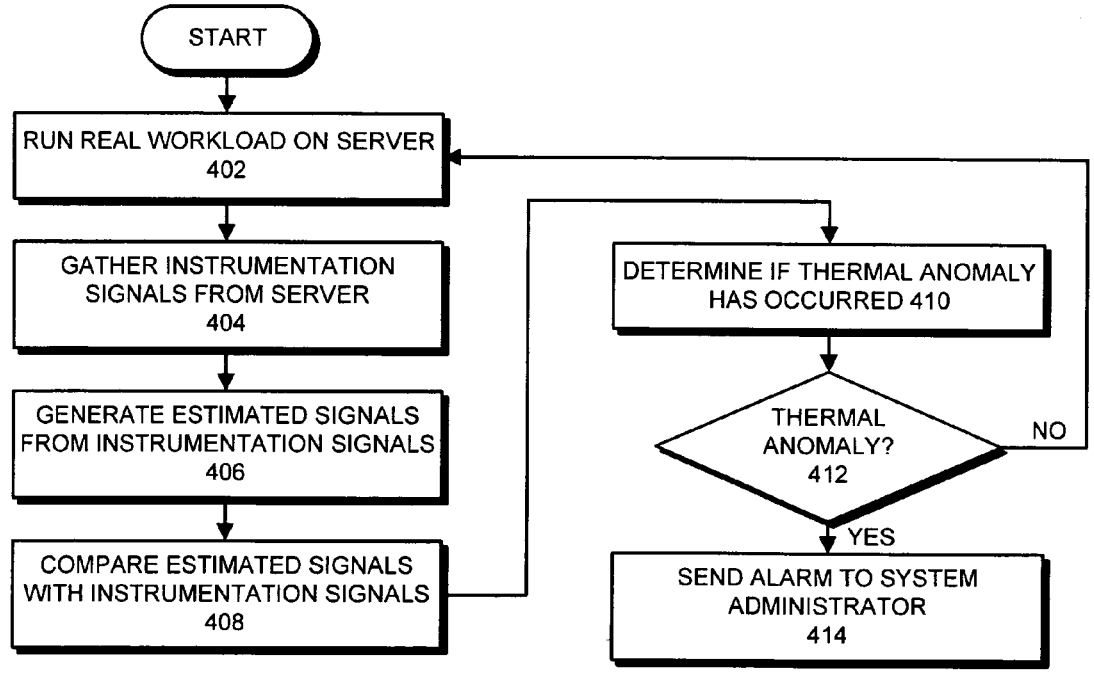
FIG. 4 presents a flow chart illustrating the process of detecting a thermal anomaly in accordance with an embodiment of the present invention.

FIGS. 3 and 4 illustrate a process that detects thermal anomalies in accordance with an embodiment of the present invention. The process starts when a real workload 302 is executed on server 104 (step 402). During this execution, the process gathers instrumentation signals 307 from possibly hundreds of sensors within server 104 (step 404). These instrumentation signals feed into MSET device 108, which uses previously determined correlations between instrumentation signals 110 to generate a set of estimated signals 309 (step 406). Note that this process generates an estimated signal for each instrumentation signal. Also, note that each estimated signal is generated by applying predetermined correlations with other signals to the actual measured values for the other signals.

Next, the instrumentation signals 307 and the estimated signals 309 feed into difference function generator 312, which compares the signals by computing pairwise differences 314 between each instrumentation signal and its corresponding estimated signal (step 408).

Next, the set of differences 314 feeds into a sequential probability ratio test (SPRT) module 316, which examines the differences 314 to determine if a thermal anomaly has occurred, for example because of an airflow blockage (step 410). Note that the SPRT is an extremely sensitive binary hypothesis test that can detect very subtle changes in time series signals with a high confidence factor, a high avoidance of "false positives," and a short time-to-detection. In fact, the SPRT method has the shortest mathematically possible time to annunciation for detecting a subtle anomaly in noisy process variables. In general, the system can determine that a thermal anomaly has occurred in a number of ways. For example, the system can detect a thermal anomaly if one of the differences (or a function of multiple differences) exceeds a predetermined threshold value.

If at step 410 the system has determined that a thermal anomaly has occurred, the system can send an alarm to a system administrator 318 (step 412). This allows the system administrator to take a remedial action, such as: replacing a failed fan; removing an airflow blockage inside the machine; removing an airflow obstruction at the inlet or output of the machine's cooling system; or replacing an air filter.

In one embodiment of the present invention, the system sends an email to a human system administrator if an air-flow obstruction is detected. Additional alarm triggers can be tied to a realtime air-filter clogging gauge, as well to sensor disturbance events (such as sensor failure, time-constant drift, or decalibration bias).

Instead of (or in addition to) sending an alarm to a system administrator, the present invention can be configured to automatically perform some type of remedial action, such as increasing the fan speed to compensate for the thermal anomaly.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a thermal anomaly in a computer system, comprising:
   determining correlations between instrumentation signals in the computer system;
   deriving an estimated signal for a thermal sensor in the computer system from the correlations;
   comparing an actual signal from the thermal sensor with the estimated signal to determine whether a thermal anomaly exists in the computer system; and
   if a thermal anomaly exists, generating an alarm.

2. The method of claim 1, wherein generating the alarm involves communicating the alarm to a system administrator so that the system administrator can take remedial action.

3. The method of claim 2, wherein communicating the alarm to the system administrator involves communicating information specifying the nature of the thermal anomaly to the system administrator.

4. The method of claim 1, wherein comparing the actual signal with the estimated signal involves using sequential detection methods to detect changes in the relationship between the actual signal and the estimated signal.

5. The method of claim 4, wherein the sequential detection methods include the Sequential Probability Ratio Test (SPRT).

6. The method of claim 1, wherein determining the correlations involves using a non-linear, non-parametric regression technique to determine the correlations.

7. The method of claim 6, wherein the non-linear, non-parametric regression technique can include a multivariate state estimation technique.

8. The method of claim 1, wherein the instrumentation signals can include:
   signals associated with internal performance parameters maintained by software within the computer system;

signals associated with physical performance parameters measured through sensors within the computer system; and signals associated with canary performance parameters for synthetic user transactions, which are periodically generated for the purpose of measuring quality of service from and end user's perspective.

9. The method of claim 1,
wherein deriving the estimated signal for the thermal sensor involves deriving multiple estimated signals for multiple thermal sensors in the computer system; and
wherein comparing the actual signal with the estimated signal involves comparing multiple actual signals with the multiple estimated signals to determine whether a thermal anomaly exists in the computer system.

10. A computer-readable storage medium storing instructions that when executed by a computer cause the computer to perform a method for detecting a thermal anomaly in a computer system, the method comprising:
determining correlations between instrumentation signals in the computer system;
deriving an estimated signal for a thermal sensor in the computer system from the correlations;
comparing an actual signal from the thermal sensor with the estimated signal to determine whether a thermal anomaly exists in the computer system; and
if a thermal anomaly exists, generating an alarm.

11. The computer-readable storage medium of claim 10, wherein generating the alarm involves communicating the alarm to a system administrator so that the system administrator can take remedial action.

12. The computer-readable storage medium of claim 11, wherein communicating the alarm to the system administrator involves communicating information specifying the nature of the thermal anomaly to the system administrator.

13. The computer-readable storage medium of claim 10, wherein comparing the actual signal with the estimated signal involves using sequential detection methods to detect changes in the relationship between the actual signal and the estimated signal.

14. The computer-readable storage medium of claim 13, wherein the sequential detection methods include the Sequential Probability Ratio Test (SPRT).

15. The computer-readable storage medium of claim 10, wherein determining the correlations involves using a non-linear, non-parametric regression technique to determine the correlations.

16. The computer-readable storage medium of claim 15, wherein the non-linear, non-parametric regression technique can include a multivariate state estimation technique.

17. The computer-readable storage medium of claim 10, wherein the instrumentation signals can include:
signals associated with internal performance parameters maintained by software within the computer system;
signals associated with physical performance parameters measured through sensors within the computer system; and
signals associated with canary performance parameters for synthetic user transactions, which are periodically generated for the purpose of measuring quality of service from and end user's perspective.

18. The computer-readable storage medium of claim 10, wherein deriving the estimated signal for the thermal sensor involves deriving multiple estimated signals for multiple thermal sensors in the computer system; and
wherein comparing the actual signal with the estimated signal involves comparing multiple actual signals with the multiple estimated signals to determine whether a thermal anomaly exists in the computer system.

19. An apparatus that detects a thermal anomaly in a computer system, comprising:
a correlation determination mechanism configured to determine correlations between instrumentation signals in the computer system;
an estimation mechanism configured to derive an estimated signal for a thermal sensor in the computer system from the correlations;
a comparison mechanism configured to compare an actual signal from the thermal sensor with the estimated signal to determine whether a thermal anomaly exists in the computer system; and
an alarm generation mechanism, wherein if a thermal anomaly exists, the alarm generation mechanism is configured to generate an alarm.

20. The apparatus of claim 19, wherein the alarm generation mechanism is configured to communicate the alarm to a system administrator so that the system administrator can take remedial action.

21. The apparatus of claim 20, wherein the alarm generation mechanism is configured to communicate information specifying the nature of the thermal anomaly to the system administrator.

22. The apparatus of claim 19, wherein the comparison mechanism is configured to use sequential detection methods to detect changes in the relationship between the actual signal and the estimated signal.

23. The apparatus of claim 22, wherein the sequential detection methods include the Sequential Probability Ratio Test (SPRT).

24. The apparatus of claim 19, wherein the correlation determination mechanism is configured to use a non-linear, non-parametric regression technique to determine the correlations.

25. The apparatus of claim 24, wherein the non-linear, non-parametric regression technique can include a multivariate state estimation technique.

26. The apparatus of claim 19, wherein the instrumentation signals can include:
signals associated with internal performance parameters maintained by software within the computer system;
signals associated with physical performance parameters measured through sensors within the computer system; and
signals associated with canary performance parameters for synthetic user transactions, which are periodically generated for the purpose of measuring quality of service from and end user's perspective.

27. The apparatus of claim 19,
wherein the estimation mechanism is configured to derive estimated signals for multiple thermal sensors in the computer system; and
wherein the comparison mechanism is configured to compare multiple actual signals with the multiple estimated signals to determine whether a thermal anomaly exists in the computer system.

* * * * *

UNITED STATES PATENT AND TRADEMARK OFFICE
CERTIFICATE OF CORRECTION

PATENT NO.   : 6,950,773 B1
DATED         : September 27, 2005
INVENTOR(S)  : Kenny C. Gross It is certified that error appears in the above-identified patent and that said Letters Patent is hereby corrected as shown below:

Column 7,
Lines 7 and 61, delete "and" and replace with -- an --.

Column 8,
Line 54, delete "and" and replace with -- an --.

Signed and Sealed this

Twenty-fourth Day of January, 2006

JON W. DUDAS
*Director of the United States Patent and Trademark Office*